(12) United States Patent
Yang

(10) Patent No.: US 10,880,943 B2
(45) Date of Patent: Dec. 29, 2020

(54) METHOD, TERMINAL, BASE STATION, AND STORAGE MEDIUM FOR HANDLING RADIO LINK FAILURE

(71) Applicant: ZTE CORPORATION, Shenzhen (CN)

(72) Inventor: Li Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 522 days.

(21) Appl. No.: 15/310,262

(22) PCT Filed: Jan. 21, 2015

(86) PCT No.: PCT/CN2015/071238
§ 371 (c)(1),
(2) Date: Nov. 10, 2016

(87) PCT Pub. No.: WO2015/172579
PCT Pub. Date: Nov. 19, 2015

(65) Prior Publication Data
US 2017/0265242 A1 Sep. 14, 2017

(30) Foreign Application Priority Data
May 13, 2014 (CN) .......................... 2014 1 0201926

(51) Int. Cl.
*H04W 24/00* (2009.01)
*H04W 76/18* (2018.01)
(Continued)

(52) U.S. Cl.
CPC .......... *H04W 76/18* (2018.02); *H04W 76/15* (2018.02); *H04W 76/19* (2018.02); *H04W 76/27* (2018.02); *H04W 88/06* (2013.01); *H04W 88/08* (2013.01)

(58) Field of Classification Search
None
See application file for complete search history.

(56) References Cited

U.S. PATENT DOCUMENTS 9,307,425 B2    4/2016   Jiang et al.
9,936,426 B2    4/2018   Zhang et al.
(Continued)

FOREIGN PATENT DOCUMENTS

CN    102123458 A    7/2011
CN    103108351 A    5/2013
(Continued)

OTHER PUBLICATIONS

Extended European Search Report dated Jul. 5, 2017 for European Patent Application No. 15792438.2.
(Continued)

*Primary Examiner* — Jinsong Hu
*Assistant Examiner* — Alexander J Yi
(74) *Attorney, Agent, or Firm* — Morgan, Lewis & Bockius LLP

(57) ABSTRACT

Disclosed is a method for handling a radio link failure, including: a User Equipment (UE) in dual-connectivity configuration receiving a first configuration message; when a failure occurs in a first radio link of the UE, sending a Radio Resource Control (RRC) connection re-establishment request; and, in an RRC connection re-establishment process, when the UE detects that no failure occurs in a second radio link, performing data transmission through the second radio link. Also disclosed are another four methods, user equipments, base stations and storage mediums for handling a radio link failure.

7 Claims, 9 Drawing Sheets

When a failure occurs in a first radio link of a UE in a dual-connectivity configuration, an RRC connection re-establishment request message is sent    301

In an RRC connection re-establishment process, when the UE detects that no failure occurs in a second radio link, data transmission is performed through the second radio link    302

(51) Int. Cl.
*H04W 76/19* (2018.01)
*H04W 76/15* (2018.01)
*H04W 76/27* (2018.01)
*H04W 88/06* (2009.01)
*H04W 88/08* (2009.01)

(56) References Cited

U.S. PATENT DOCUMENTS

| | | | |
|---|---|---|---|
| 2011/0286327 A1 | 11/2011 | Chen et al. | |
| 2014/0248882 A1 | 9/2014 | Wang et al. | |
| 2014/0321267 A1* | 10/2014 | Jiang | H04L 45/28 370/225 |
| 2015/0201354 A1* | 7/2015 | Zhang | H04W 36/30 370/221 |

FOREIGN PATENT DOCUMENTS

| | | | |
|---|---|---|---|
| CN | 103200599 A | 7/2013 | |
| GB | 2475164 A * | 11/2011 | H04L 5/0007 |
| WO | 2010/088329 A1 | 8/2010 | |
| WO | 2014047772 A1 | 4/2014 | |
| WO | 2015172579 A1 | 11/2015 | |
| WO | 2016/045625 A2 | 3/2016 | |

OTHER PUBLICATIONS

Kyocera: "RLF issues in inter-eNB CA", 3GPP Draft; R2-134317 Inter-Enb CA, 3rd Generation Partnership Project (3GPP), Mobile Competence Centre; 650, Route Des Lucioles; F-06921 Sophia-Antipolis Cedex; France, vol. RAN WG2, No. San Francisco; Nov. 11-15, 2013. Nov. 2, 2013, XP050753432, retrieved from the internet: url:http://www.3gpp.org/ftp/tsg_ran/WG2_RL2/TSGR2_84/Docs/.

Ericsson: "L2 transport of SRBs and relation to RLF handling", 3GPP Draft; R2-134221—L2 transport of SRBS and relation to RLF handling, 3rd Generation Partnership Project (3GPP), Mobile Competence Centre; 650, 650, Route Des Lucioles; F-06921 Sophia-Antipolis Cedex; France, vol. RAN WG2, No. San Francisco, USA; Nov. 11-15, 2013. Nov. 2, 2013, XP050753394, retrieved from the internet: url:http://www.3gpp.org/ftp/tsg_ran/WG2_RL2/TSGR2_84/Docs/.

International Search Report and Written Opinion dated Apr. 17, 2015, for International Patent Application No. PCT/CN2015/071238.

"Overall procedures for offloading over Xn," Ericsson, 3GPP TSG-RAN WG2 Meeting #81 bis R3-131794, Sep. 27, 2013, text, segment 2.5 (9pp).

Machine Translation of Office Action dated Jan. 11, 2019 in CN Patent Application No. 201410201926.7.

Machine Translation of Office Action dated Aug. 26, 2019 in CN Patent Application No. 201410201926.7.

Office Action dated Dec. 20, 2018 in EP Patent Application No. 15 792 438.2-1231.

Office Action dated Jul. 1, 2019 in EP Patent Application No. 15 792 438.2-1231.

Office Action dated Nov. 7, 2019 in EP Patent Application No. 15 792 438.2-1231.

Decision of Rejection dated Feb. 18, 2020 for Chinese Patent Application No. 201410201926.7 and English Translation.

Reexamination Decision dated May 18, 2020 for Chinese Patent Application No. 201410201926.7 and English Translation.

Office Action dated Mar. 26, 2020 for European Patent Application No. 15792438.2.

* cited by examiner

METHOD, TERMINAL, BASE STATION, AND STORAGE MEDIUM FOR HANDLING RADIO LINK FAILURE

CROSS-REFERENCE TO RELATED APPLICATIONS

This application is the U.S. National Phase application of PCT application number PCT/CN2015/071238 having a PCT filing date of Jan. 21, 2015, which claims the priority of Chinese patent application 201410201926.7 filed on May 13, 2014, the disclosures of which are hereby incorporated by reference.

TECHNICAL FIELD

The present document relates to a data transmission technology of a radio communication system, in particular to, a method for handling a radio link failure, a terminal, a base station and a storage medium.

BACKGROUND

Since spectrum resources for Long Term Evolution (LTE) systems are relatively deficient, the deployment of Master eNodeBs (MeNB) gradually cannot satisfy a great amount of service demands with the increment of LTE mobile users, therefore, operators perform coverage of hotspots through Low Power Node (LPN) networking. The LPN is also called as a micro-cell, the coverage range of the LPN is much smaller than that of a macro-cell and the LPN is usually covered by inter-frequency macro-cell in an umbrella manner.

At present, the LTE technology has already been capable of supporting a User Equipment (UE) to be simultaneously in communication connections with a macro-cell and a micro-cell, which is called as LTE Dual Connectivity (DC); and a working principle of the LTE DC technology is as illustrated in FIG. 1, and a UE in an LTE DC working mode can simultaneously perform uplink and downlink duplex communication with an MeNB and a Secondary eNodeB (SeNB), therein the MeNB is an anchor eNB in an aspect of UE control, which is responsible for UE mobility and Radio Resource Control (RRC) configuration management, etc., and has a function of connecting a core network and the UE; and the SeNB logically must be attached to the MeNB through an X2 interface to provide functions related to user information transmission for the UE and enhance the data transmission rate. Therefore, it may be simply understood as that, non-access layer control signaling interaction between the UE and a Mobility Management Entity (MME) of an LTE core network can be realized only through the MeNB, and access layer control signaling interaction between the UE and an eNB of the LTE access network can also be realized only through the MeNB; user information interaction between the UE and the LTE core network and an access network can be realized not only through the MeNB, but also can be realized through the SeNB; and control signaling interaction between the SeNB and the MME of the core network or UE must be realized through relaying by the MeNB.

The LTE DC technology includes three basic radio bearer types, as illustrated in FIG. 2, therein, FIG. 2(a) illustrates an LTE DC radio main bearer, and uplink and downlink data transmission of the user information is realized through the MeNB; FIG. 2(b) illustrates an LTE DC radio split bearer, and downlink data transmission of the user information is realized simultaneously through the MeNB and the SeNB; and FIG. 2(c) illustrate an LTE DC radio auxiliary bearer, and uplink and downlink data transmission of the user information is realized through the SeNB.

Under a normal condition, a Radio Link (RL) of the UE is in a good uplink communication state and can perform reliable data sending and data receiving. However, due to causes such as attenuation or refraction of radio signals of the UE, an uplink and downlink data transmission failure, i.e., a Radio Link Failure (RLF) of the RL is caused; and the RLF is specifically reflected as that: when the UE cannot synchronously receive data with a physical layer of the downlink RL, UE uplink data cannot randomly access to a serving eNB through a random access channel of a media access control layer, and UE performs uplink and downlink data transmission, a failure of maximum times of retransmission of a radio link control layer Acknowledged Mode (AM) occurs.

According to the existing LTE standardized technology, the UE in the DC working mode is configured with split bearing and/or auxiliary bearing, and when the RLF of the UE occurs on a primary cell (Pcell) of the MeNB, the UE must stop any uplink and downlink user data transmission with all eNBs (including the MeNB and SeNB) which serve the UE; and moreover, Radio Resource Control (RRC) connection re-establishment and radio link recovery are performed. Under this situation, even though radio link signals on a SeNB side are good and no RLF occurs, normal data transmission between the UE and the SeNB will also be interrupted; and at this moment, the UE will completely stop data transmission with both the MeNB and the SeNB, which causes that user data are lost seriously.

SUMMARY

In view of this, the embodiments of the present document is expected to provide a method for handling a radio link failure, a terminal, a base station and a storage medium, such that losses of data transmission can be reduced under a situation that a radio link failure occurs.

The technical scheme of the embodiments of the present document is implemented as follows:

Embodiment 1 of the present document provides a method for handling a radio link failure, including:

a User Equipment, UE, in dual-connectivity configuration receiving a first configuration message;

when a failure occurs in a first radio link of the UE, sending a Radio Resource Control, RRC, connection re-establishment request message; and in an RRC connection re-establishment process, when the UE detects that no failure occurs in a second radio link, performing data transmission through the second radio link according to the first configuration message.

In the above-mentioned implementation scheme, the method further includes: setting a timer in the UE, and after the failure occurs in the first radio link of the UE, starting the timer.

In the above-mentioned implementation scheme, the first configuration message includes an enabling parameter.

In the above-mentioned implementation scheme, the first configuration message further includes maximum allowable time for the UE to perform the data transmission through the second radio link.

Embodiment 1 of the present document provides a User Equipment, UE, herein, the UE is in dual-connectivity configuration, including: a first receiving module, a first re-establishment module, a first detection module and a first transmission module, herein, the first receiving module is configured to receive a first configuration message;

the first re-establishment module is configured to, when a failure occurs in a first radio link of the UE, send a Radio Resource Control, RRC connection re-establishment request message, and perform a RRC connection re-establishment;

the first detection module is configured to, in an RRC connection re-establishment process, detect whether a failure occurs in a second radio link of the UE; and the first transmission module is configured to, when the first detection module detects that no failure occurs in the second radio link of the UE, perform data transmission through the second radio link according to the first configuration message.

In the above-mentioned implementation scheme, the UE further includes: a timing module configured to, after the failure occurs in the first radio link, record time for the UE to perform the data transmission through the second radio link.

In the above-mentioned implementation scheme, the first configuration message includes an enabling parameter.

In the above-mentioned implementation scheme, the first configuration message further includes maximum allowable time for the UE to perform the data transmission through the second radio link.

Embodiment 2 of the present document provides a method for handling a radio link failure, including: when a failure occurs in a first radio link of a User Equipment, UE, in dual-connectivity configuration, sending a Radio Resource Control, RRC, connection re-establishment request message; and in an RRC connection re-establishment process, when the UE detects that no failure occurs in a second radio link, performing data transmission through the second radio link.

Embodiment 2 of the present document provides a User Equipment, UE, including: a second re-establishment module, a second detection module and a second transmission module, herein, the second re-establishment module is configured to, when a failure occurs in a first radio link of the UE, send a Radio Resource Control, RRC, connection re-establishment request, and perform RRC connection re-establishment;

the second detection module is configured to detect whether a failure occurs in a second radio link of the UE; and the second transmission module is configured to, when the second detection module detects that no failure occurs in the second radio link, perform data transmission through the second radio link.

Embodiment 3 of the present document provides a method for handling a radio link failure, including: a first base station respectively sending a second configuration message and a third configuration message, herein, the second configuration message is used for being sent to a User Equipment, UE, and the third configuration message is used for being sent to a second base station.

In the above-mentioned implementation scheme, the second configuration message and the third configuration message respectively include an enabling parameter.

In the above-mentioned implementation scheme, the second configuration message and the third configuration message further respectively include maximum allowable time for the UE to perform data transmission with a base station through the second radio link.

Embodiment 3 of the present document provides a base station, including: a first sending module and a second sending module, herein, the first sending module is configured to send a second configuration message; and the second sending module is configured to send a third configuration message;

herein, the second configuration message is used for being sent to a User Equipment, UE, and the third configuration message is used for being sent to a second base station.

In the above-mentioned implementation scheme, the second configuration message and the third configuration message respectively include an enabling parameter.

In the above-mentioned implementation scheme, the second configuration message and the third configuration message further respectively include maximum allowable time for the UE to perform data transmission with the second base station through the second radio link.

Embodiment 4 of the present document provides a method for handling a radio link failure, including:

a third base station performing dual-connectivity configuration; and the third base station sending a first notification, herein, the first notification is used for being sent to a second base station.

In the above-mentioned implementation scheme, the first notification includes notifying the second base station to continue performing data transmission with a User Equipment, UE, through a second radio link.

Embodiment 4 of the present document provides a base station, including: a configuration module and a third sending module, herein, the configuration module is configured to perform dual-connectivity configuration; and the third sending module is configured to send a first notification, herein, the first notification is used for being sent to a second base station.

In the above-mentioned implementation scheme, the first notification includes notifying the second base station to perform data transmission with a User Equipment, UE, through a second radio link.

Embodiment 5 of the present document provides a method for handling a radio link failure, including: a second base station receiving a third configuration message; and the second base station receiving a first notification.

In the above-mentioned implementation scheme, the third configuration message includes an enabling parameter.

In the above-mentioned implementation scheme, the third configuration message further includes maximum allowable time for the second base station to perform data transmission with a User Equipment, UE, through a second radio link.

In the above-mentioned implementation scheme, the first notification includes notifying the second base station to perform the data transmission with the UE through a second radio link.

Embodiment 5 of the present document provides a base station, including a second receiving module and a third receiving module, herein, the second receiving module is configured to receive a third configuration message; and the third receiving module is configured to receive a first notification.

In the above-mentioned implementation scheme, the third configuration message includes an enabling parameter.

In the above-mentioned implementation scheme, the third configuration message further includes maximum allowable time for a second base station to perform data transmission with a User Equipment, UE, through a second radio link.

In the above-mentioned implementation scheme, the first notification includes notifying the second base station to perform the data transmission with the UE through the second radio link.

The embodiment of the present document further provides a computer storage medium, storing computer-executable instructions, herein, the computer-executable instructions are used to execute the above methods for handling the radio link failure.

According to the method for handling the radio link failure, the terminal, the base station and the storage medium provided by the embodiments of the present document, a UE in receives a configuration message; when a failure occurs in a first radio link of the UE, an RRC connection re-establishment request message is sent; and in an RRC connection re-establishment process, when the UE detects that no radio link failure occurs in a second radio link detected by the UE, data transmission is performed through the second radio link according to the first configuration message. Thereby, when an RLF occurs in a serving cell of a first station, the UE only needs to stop the data transmission with the first base station; and before the UE completes the RRC connection re-establishment or preset time is reached, the UE can continuously continue performing data transmission with a second base station in on which no RLF occurs, so as to reduce the losses of the data transmission.

DETAILED EMBODIMENTS OF THE INVENTION

In the embodiments of the present document, a UE in dual-connectivity configuration receives a first configuration message; when a failure occurs in a first radio link of the UE, an RRC connection re-establishment request message is sent; and in an RRC connection re-establishment process, when the UE detects that no radio link failure occurs in a second radio link, the data transmission is performed through the second radio link according to the first configuration message.

Further, a timer is set in the UE, and after the failure occurs in the first radio link of the UE, the timer is started.

Here, the first configuration message includes an enabling parameter; and the enabling parameter is used for instructing the UE to perform data transmission through the second radio link when the failure occurs in the first radio link, or perform data transmission not through the second radio link when the failure occurs in the first radio link.

Further, when the enabling parameter instructs the UE to perform the data transmission through the second radio link when the failure occurs in the first radio link, the first configuration message further includes maximum allowable time for the UE to perform data transmission through the second radio link; and a value of the maximum allowable time may be set according to an actual need.

Embodiment 1

Figure 1:
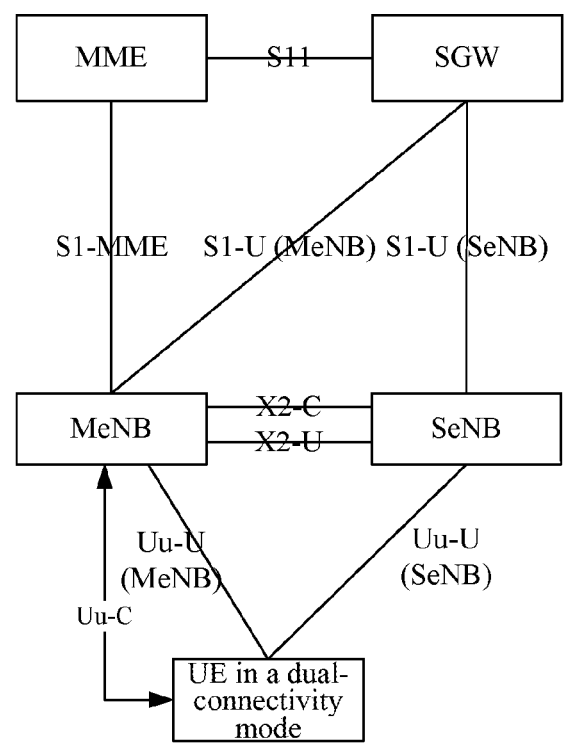
FIG. 1 illustrates a schematic diagram of a working principle of the LTE DC technology according to the present document.
Figure 2A:
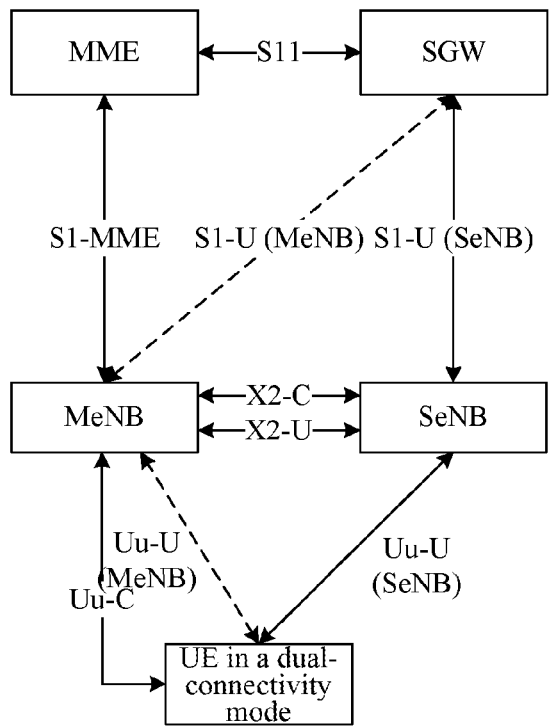
FIG. 2 illustrates schematic diagrams of working types of the LTE DC technology according to the present document.
Figure 2B:
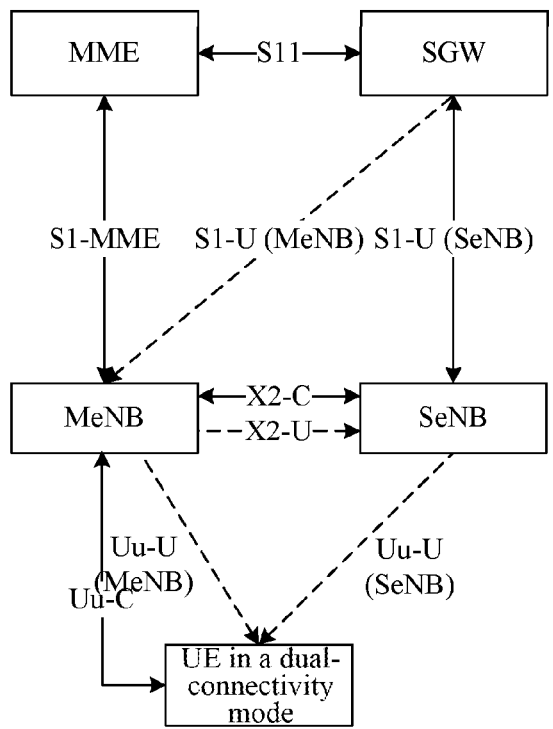
Figure 2C:
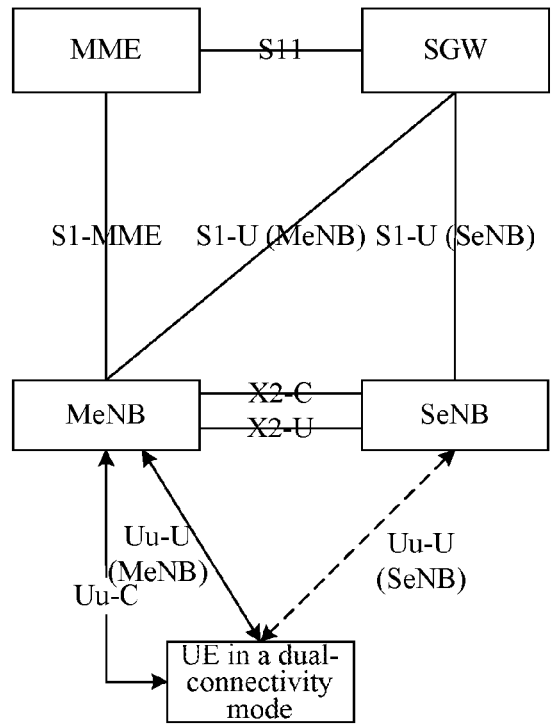
Figure 3:
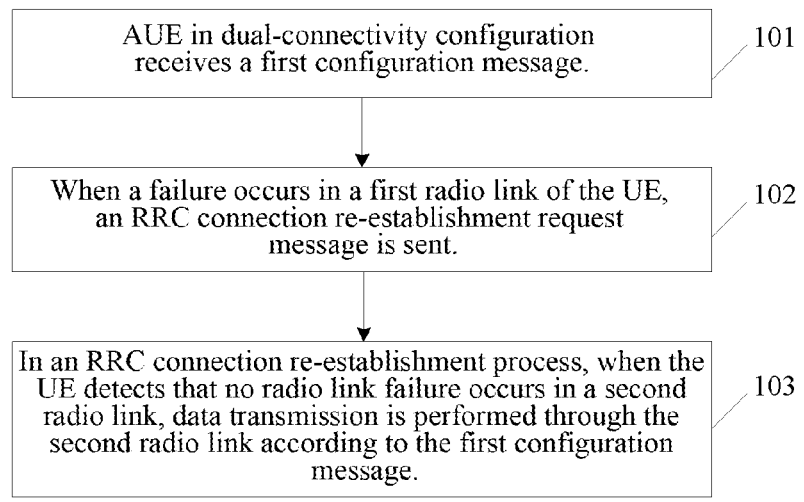
FIG. 3 illustrates a handling flowchart of a method for handling a radio link failure according to embodiment 1 of the present document.

In this embodiment, a basic handling process of a method for handling a radio link failure, as illustrated in FIG. 3, includes the following steps.

In step 101, a UE in dual-connectivity configuration receives a first configuration message.

Here, UE receives the first configuration message sent by a first base station.

Therein, the first configuration message includes an enabling parameter, the enabling parameter may be expressed as UE data transfer enabled in P-RLF and is used for instructing the UE to the perform data transmission through or not through a second radio link when a failure occurs in a first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs the data transmission not through the second radio link when the failure occurs in the first radio link.

Further, when the value of the UE data transfer enabled in P-RLF is TRUE, the first configuration message further includes maximum allowable time for the UE to perform data transmission through the second radio link, and the maximum allowable time is expressed as Max UE data transfer time in P-RLF and may be set according to an actual need.

Here, the first radio link refers to a data transmission link established between the UE and the first base station; and the second radio link refers to a data transmission link established between the UE and the second base station.

In step 102, when the failure occurs in the first radio link of the UE, an RRC connection re-establishment request message is sent.

Specifically, the UE sends an RRC connection re-establishment request to a target cell through the RRC re-connection request message.

Therein, a base station serving the target cell may be the first base station before the radio link failure occurs, and may also be a new base station that is different from the first base station.

In step 103, in an RRC connection re-establishment process, when the UE detects that no radio link failure occurs in a second radio link, data transmission is performed through the second radio link according to the first configuration message.

Further, when the UE and the target cell do not complete the RRC connection re-establishment and new DC configuration but a timer reaches the maximum allowable time for the UE to perform the data transmission through the second radio link, the UE stops performing the data transmission with the second base station through the second radio link;

or, when the timer does not reach the maximum allowable time for the UE and the second base station to perform data transmission in the first configuration message, but the UE and the target cell complete RRC connection re-establishment and new DC configuration, the UE stops performing the data transmission with the second base station through the second radio link.

Therein, the timer is preset in the UE, which is used for recording time to perform data transmission through the second radio link after the failure occurs in the first radio link of the UE.

In this embodiment, before executing step 102, the method further includes that: a timer is in the UE; and after the failure occurs in the first radio link of the UE, the timer is started.

In this embodiment, after executing step 103, the method further includes that: after the UE and the target cell complete RRC connection re-establishment and new DC configuration, the UE, the base station serving the target cell and the second base station continue performing the data transmission.

In this embodiment, the first base station may be an MeNB and the second base station may be an SeNB.

Correspondingly, the first radio link is a link for data transmission between the UE and the MeNB and the second link is a link for data transmission between the UE and the SeNB.

Figure 4:
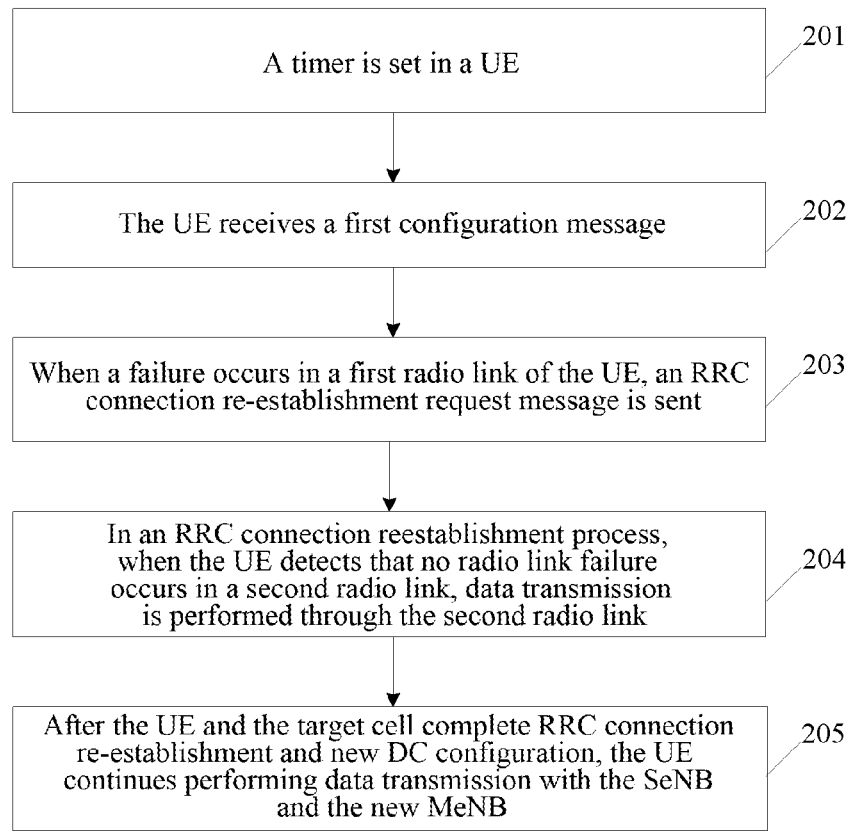
FIG. 4 illustrates a detailed handling flowchart of a method for handling a radio link failure according to embodiment 1 of the present document.

By taking that the UE is in the LTE DC configuration and the UE is configured with an RRC connection for data transmission through a source MeNB, a main bearer for data transmission only through the source MeNB and an auxiliary bearer for data transmission only through the SeNB as an example, a specific implementation process of a method for handling a radio link failure according to the embodiment of the present document is as illustrated in FIG. 4. The method includes the following steps.

In step 201, a timer is set in UE.

Therein, the timer is configured to record time to perform data transmission through a second radio link when a failure occurs in a first radio link of the UE.

In step 202, the UE receives a first configuration message.

Here, the UE receives a first configuration message sent by a first base station through an RRC connection reconfiguration message.

Therein, the first configuration message includes an enabling parameter, and the enabling parameter may be expressed as UE data transfer enabled in P-RLF and is used for instructing UE to perform data transmission through or not through the second radio link when a failure occurs in a first radio link.

In this embodiment, if a value of the UE data transfer enabled in P-RLF is TRUE, it indicates that the UE performs the data transmission through a second radio link when the failure occurs in the first radio link.

Further, the first configuration message further includes maximum allowable time for the UE to perform the data transmission through the second radio link, which is expressed as Max UE data transfer time in P-RLF.

In this embodiment, the Max UE data transfer time in P-RLF=50 ms expresses that the maximum allowable time for the UE to perform the data transmission through the second radio link is 50 ms.

Here, the first radio link refers to a data transmission link established between the UE and the first base station; and the second radio link refers to a data transmission link established between the UE and a second base station.

The first base station may be an MeNB and the second base station may be an SeNB.

In step 203, when the failure occurs in a first radio link of the UE, an RRC connection re-establishment request message is sent.

Specifically, the UE sends an RRC connection re-establishment request to a target cell through the RRC connection re-establishment request message; and the UE starts the timer when the failure occurs in the first radio link of the UE.

Here, a base station serving the target cell is a new MeNB that is different from the first base station.

In step 204, in an RRC connection re-establishment process, when the UE detect that no radio link failure occurs in a second radio link, the data transmission is performed through the second radio link.

Specifically, the UE performs data transmission through the second radio link according to the first configuration message, and when the timer reaches 50 ms, the data transmission through the second radio link is stopped.

In step 205, after the UE and the target cell complete RRC connection re-establishment and new DC configuration, the UE, the SeNB and the new MeNB continue performing the data transmission.

Figure 5:
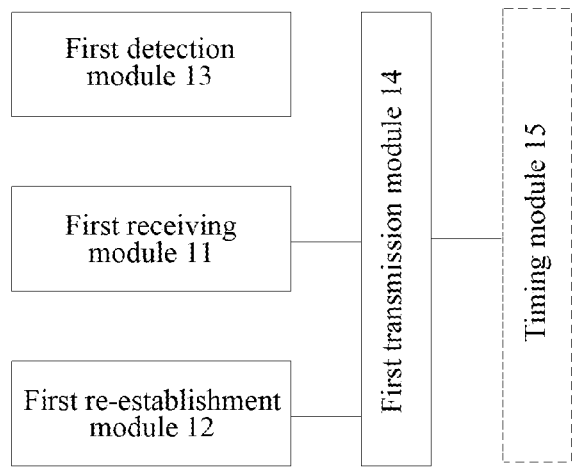
FIG. 5 illustrates a structural schematic diagram of components of a User Equipment according to embodiment 1 of the present document.

In order to implement the method for handling the radio link failure, embodiment 1 of the present document provides a UE. A component structure of the UE is as illustrated in FIG. 5 and the UE includes: a first receiving module 11, a first re-establishment module 12, a first detection module 13, a first transmission module 14 and a timing module 15, herein, the first receiving module 11 is configured to receive a first configuration message;

the first re-establishment module 12 is configured to, when a failure occurs in a first radio link of the UE, send an RRC connection re-establishment request to perform RRC connection re-establishment;

the first detection module 13 is configured to, in an RRC connection re-establishment process, detect whether a failure occurs in a second radio link of the UE the first transmission module 14 is configured to, when the first detection module 13 detects that the failure does not occur in the second radio link of the UE, perform data transmission through the second radio link according to the first configuration message; and the timing module 15 is configured to record time for the UE to perform the data transmission through the second radio link.

Therein, the first configuration message includes an enabling parameter, and the enabling parameter may be expressed as UE data transfer enabled in P-RLF and is used for instructing the UE to perform the data transmission through or not through the second radio link when the failure occurs in the first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs the data transmission not through the second radio link when the failure occurs in the first radio link.

Further, when the value of UE data transfer enabled in P-RLF is TRUE, the first configuration message further includes maximum allowable time for the UE to perform the data transmission through the second radio link, herein the maximum allowable time is expressed as Max UE data transfer time in P-RLF and may be set according to an actual need.

Here, the first radio link refers to a data transmission link established between the UE and the first base station; and the second radio link refers to a data transmission link established between the UE and a second base station.

The first transmission module 14 performs data transmission through the second radio link, including that:

the first transmission module 14 performs the data transmission through the second radio link according to the first configuration message and starts the timing module 15.

Further, when the UE and the target cell do not complete RRC connection re-establishment and new DC configuration but the timing module reaches the maximum allowable time for the UE to perform data transmission through the second radio link, the UE stops performing the data transmission through the second radio link;

or, when the timing module does not reach the maximum allowable time for the UE to perform the data transmission in the first configuration message but the UE and the target cell complete RRC connection re-establishment and new DC configuration, the UE stops performing the data transmission through the second radio link.

Therein, the first re-establishment module 12 sends the RRC connection re-establishment request message, including that: the UE sends an RRC connection re-establishment request to the target cell through the RRC connection re-establishment request message.

Here, a base station serving the target cell may be the first base station and may also be a new base station that is different from the first base station.

In embodiment 1 of the present document, the first base station may be an MeNB and the second base station may be an SeNB.

Correspondingly, the first radio link is a link for data transmission between the UE and the MeNB and the second radio link is a link for data transmission between the UE and the SeNB.

Embodiment 2

Figure 6:
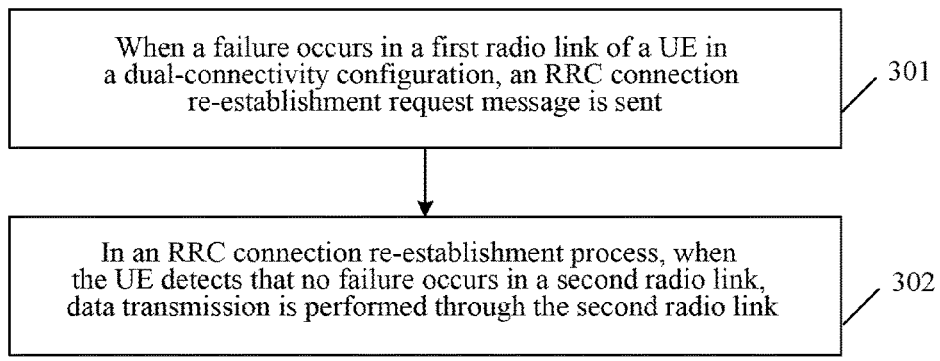
FIG. 6 illustrates a handling flowchart of a method for handling a radio link failure according to embodiment 2 of the present document.

In this embodiment, a basic handling process of a method for handling a radio link failure, as illustrated in FIG. 6, includes the following steps:

In step 301, when a failure occurs in a first radio link of a UE in dual-connectivity configuration, an RRC connection re-establishment request message is sent.

Here, the first radio link refers to a data transmission link established between the UE and a first base station.

Specifically, the UE sends an RRC connection re-establishment request to a target cell through the RRC connection re-establishment request message.

Therein, a base station serving the target cell may be the first base station before a radio link failure occurs, and may also be a new base station that is different from the first base station.

In step 302, in an RRC connection re-establishment process, when the UE detects that no failure occurs in a second radio link, the data transmission is performed through the second radio link.

Here, the second radio link refers to a data transmission link established between the UE and the second base station.

In this embodiment, after executing step 302, the method further includes that:

after the UE and the target cell complete RRC connection re-establishment and new DC configuration, the UE, continues performing the data transmission with the base station serving the target cell and the second base station.

In this embodiment, the first base station may be an MeNB and the second base station may be an SeNB.

Correspondingly, the first radio link is a link for data transmission between the UE and the MeNB and the second link is a link for data transmission between the UE and the SeNB.

Figure 7:
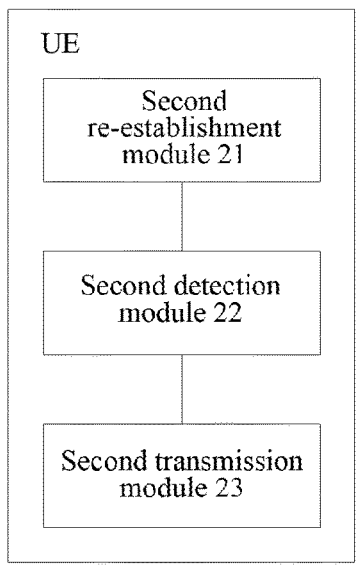
FIG. 7 illustrates a structural schematic diagram of components of a User Equipment according to embodiment 2 of the present document.

In order to implement the above method for handling the radio link failure, this embodiment further provides a UE. A component structure of the UE is as illustrated in FIG. 7 and the UE includes: a second re-establishment module 21, a second detection module 22 and a second transmission module 23, herein, the second re-establishment module 21 is configured to, when a failure occurs in a first radio link of the UE, send an RRC connection re-establishment request to perform RRC connection re-establishment.

Specifically, the second re-establishment module 21 sends the RRC connection re-establishment request to a target cell through an RRC connection re-establishment request message.

Therein, a base station serving the target cell may be a first base station before the radio link failure occurs and may also be a new base station that is different from the first base station.

Here, the first radio link refers to a data transmission link established between the UE and the first base station.

The second detection module 22 is configured to detect whether a failure occurs in a second radio link of the UE.

Here, the second radio link refers to a data transmission link established between the UE and a second base station.

The second transmission module 23 is configured to, when the second detection module 22 detects that the failure does not occur in the second radio link, perform data transmission through the second radio link.

In this embodiment, the first base station may be an MeNB and the second base station may be an SeNB; and correspondingly, the first radio link is a link for data transmission between the UE and the MeNB and the second radio link is a link for data transmission between the UE and the SeNB.

Embodiment 3

Figure 8:
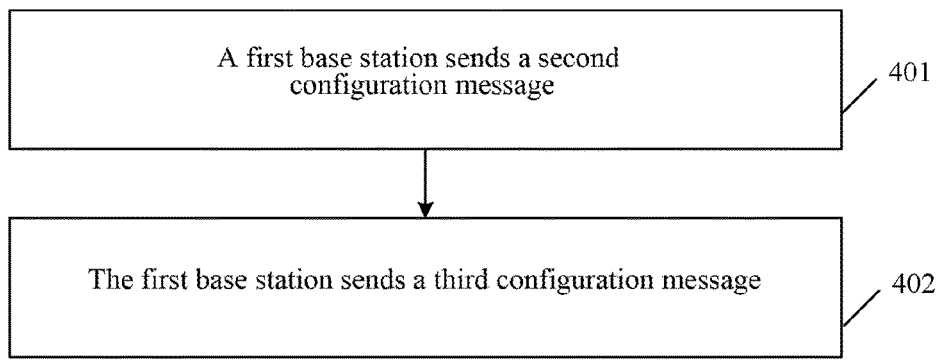
FIG. 8 illustrates a handling flowchart of a method for handling a radio link failure according to embodiment 3 of the present document.

In this embodiment, a basic handling process of a method for handling a radio link failure, as illustrated in FIG. 8, includes the following steps.

In step 401, a first base station sends a second configuration message.

Specifically, the first base station sends the second configuration message to UE through an RRC connection reconfiguration message.

Therein, the second configuration message includes an enabling parameter, and the enabling parameter may be expressed as UE data transfer enabled in P-RLF and is used for instructing the UE to perform data transmission through or not through a second radio link when a failure occurs in a first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs the data transmission not through the second radio link when the failure occurs in the first radio link.

Further, when the value of the UE data transfer enabled in P-RLF is TRUE, the second configuration message further includes maximum allowable time for the UE to perform the data transmission through the second radio link, herein the maximum allowable time is expressed as Max UE data transfer time in P-RLF and may be set according to an actual need.

Here, the first radio link refers to a data transmission link established between the UE and the first base station; and the second radio link refers to a data transmission link established between the UE and a second base station.

In step 402, the first base station sends a third configuration message.

Specifically, the first base station sends the third configuration message to the second base station through an eNB configuration update message.

Therein, the third configuration message includes an enabling parameter, and the enabling parameter may be expressed as UE data transfer enabled in P-RLF and is used for instructing UE to perform data transmission through or not through a second radio link when a failure occurs in a first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs the data transmission not through the second radio link when the failure occurs in the first radio link.

Further, when the value of the UE data transfer enabled in P-RLF is TRUE, the third configuration message further includes maximum allowable time for the UE to perform the data transmission through the second radio link, herein the maximum allowable time is expressed as Max UE data transfer time in P-RLF and may be set according to an actual need.

Here, the first radio link refers to a data transmission link established between the UE and the first base station; and the second radio link refers to a data transmission link established between the UE and the second base station.

In this embodiment, there is no sequence for executing step 401 and step 402; and the first base station may be an MeNB and the second base station may be an SeNB.

Correspondingly, the first radio link is a link for data transmission between the UE and the MeNB and the second radio link is a link for data transmission between the UE and the SeNB.

Figure 9:
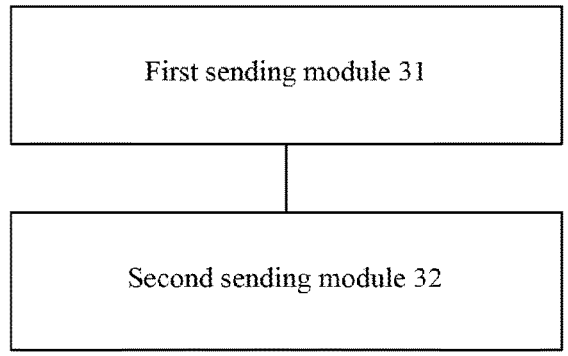
FIG. 9 illustrates a structural schematic diagram of components of a base station according to embodiment 3 of the present document.

In order to implement the method for handling the radio link failure, this embodiment further provides a base station. A component structure of the base station is as illustrated in FIG. 9 and the base station includes: a first sending module 31 and a second sending module 32, herein, the first sending module 31 is configured to send a second configuration message.

Specifically, the second configuration message is sent to the UE through an RRC connection reconfiguration message.

The second sending module 32 is configured to send a third configuration message.

Specifically, the third configuration message is sent to a second base station through an eNB configuration update message.

Therein, the second configuration message and the third configuration message respectively include an enabling parameter, and the enabling parameter may be expressed as UE data transfer enabled in P-RLF and is used for instructing UE to perform the data transmission through or not through the second radio link when the failure occurs in the first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs the data transmission not through the second radio link when the failure occurs in the first radio link.

Further, when the value of the UE data transfer enabled in P-RLF is TRUE, the second configuration message and the third configuration message further respectively include maximum allowable time for the UE to perform the data transmission through the second radio link, and the maximum allowable time is expressed as Max UE data transfer time in P-RLF and may be set according to an actual need.

Here, the first radio link refers to a data transmission link established between the UE and the first base station; and the second radio link refers to a data transmission link established between the UE and the second base station.

In this embodiment, the first base station may be an MeNB and the second base station may be an SeNB.

Correspondingly, the first radio link is a link for data transmission between the UE and the MeNB and the second link is a link for data transmission between the UE and the SeNB.

Embodiment 4

Figure 10:
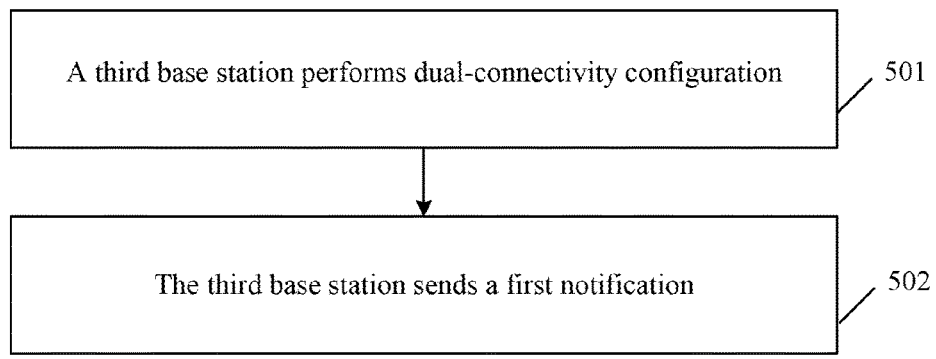
FIG. 10 illustrates a handling flowchart of a method for handling a radio link failure according to embodiment 4 of the present document.

In this embodiment, a basic handling process of a method for handling a radio link failure, as illustrated in FIG. 10, includes the following steps.

In step 501, a third base station performs dual-connectivity configuration.

Specifically, the third base station performs the dual-connectivity configuration on a UE through an RRC connection re-establishment message.

In step 502, the third base station sends a first notification.

Specifically, the third base station sends the first notification to a second base station through an eNB configuration update message, or sends the first notification to the second base station through an error indication message.

Therein, the first notification includes notifying the second base station to continue performing data transmission with the UE through a second radio link.

In this embodiment, the second base station may be an SeNB, the third base station may be an MeNB as the same as the first base station and the base station may also be an MeNB that is different from the first base station.

Correspondingly, the second radio link is a link for data transmission between the UE and the SeNB.

Figure 11:
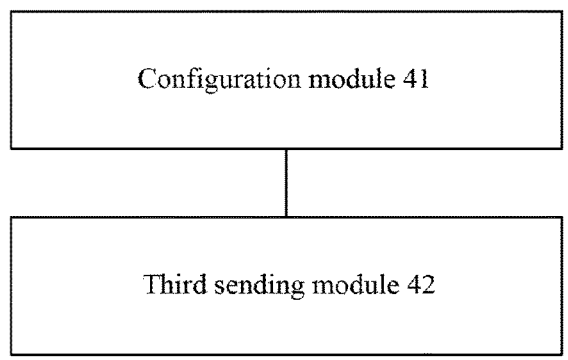
FIG. 11 illustrates a structural schematic diagram of components of a base station according to embodiment 4 of the present document.

In order to implement the method for handling the radio link failure, this embodiment further provides a base station. A component structure of the base station is as illustrated in FIG. 11 and the base station includes: a configuration module 41 and a third sending module 42, herein, the configuration module 41 is configured to perform dual-connectivity configuration.

Specifically, the configuration module 41 performs dual-connectivity configuration on a UE through an RRC connection re-establishment message.

The third sending module 42 is configured to send a first notification.

Specifically, the third sending module 42 sends the first notification to a second base station through an eNB configuration update message, or sends the first notification to the second base station through an error indication message.

Therein, the first notification includes notifying the second base station to continue performing the data transmission with the UE through a second radio link.

In this embodiment, the second base station may be an SeNB, and correspondingly the second radio link is a link for data transmission between the UE and the SeNB.

Embodiment 5

Figure 12:
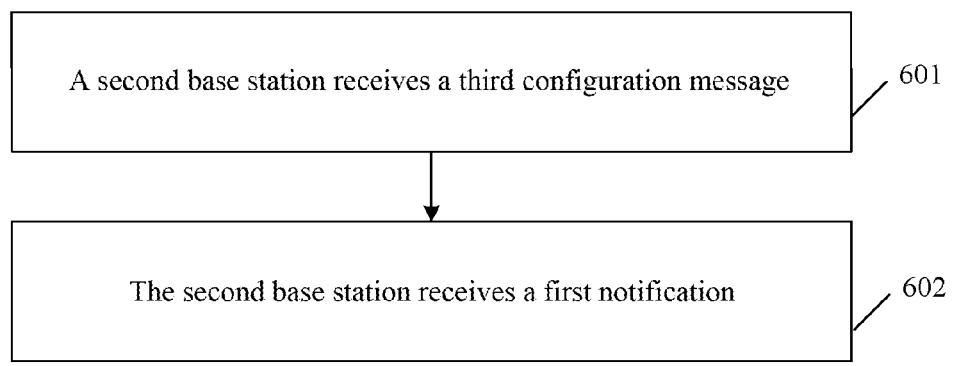
FIG. 12 illustrates a handling flowchart of a method for handling a radio link failure according to embodiment 5 of the present document.

In this embodiment, a basic handling process of a method for handling a radio link failure, as illustrated in FIG. 12, includes the following steps.

In step 601, a second base station receives a third configuration message.

Specifically, the second base station receives the third configuration message through an eNB configuration update message.

Therein, the third configuration message includes an enabling parameter, herein the enabling parameter may be expressed as UE data transfer enabled in P-RLF and is used for instructing UE to perform data transmission through or not through a second radio link when a failure occurs in a first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs the data transmission not through the second radio link when the failure occurs in the first radio link.

Further, when the value of the UE data transfer enabled in P-RLF is TRUE, the third configuration message further includes maximum allowable time for the UE to perform the data transmission through the second radio link, and the maximum allowable time is expressed as Max UE data transfer time in P-RLF and may be set according to an actual need.

Here, the first radio link refers to a data transmission link established between the UE and the first base station; and the second radio link refers to a data transmission link established between the UE and the second base station.

In step 602, the second base station receives a first notification.

Specifically, the second base station receives the first notification through an eNB configuration update message or an error indication message.

Therein, the first notification includes notifying the second base station to perform the data transmission with the UE through a second radio link.

In this embodiment, the second base station may be an SeNB, and correspondingly, the second radio link is a link for data transmission between the UE and the SeNB.

Figure 13:
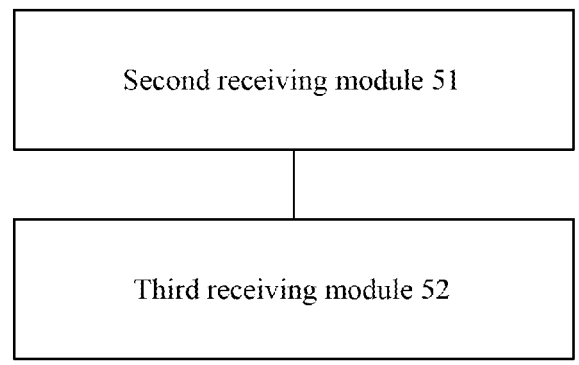
FIG. 13 illustrates a structural schematic diagram of components of a base station according to embodiment 5 of the present document.

In order to implement the method for handling the radio link failure, this embodiment further provides a base station. A component structure of the base station is as illustrated in FIG. 13 and the base station includes: a second receiving module 51 and a third receiving module 52, herein, the second receiving module 51 is configured to receive a third configuration message.

Specifically, the second receiving module 51 receives the third configuration message through an eNB configuration update message.

Therein, the third configuration message includes an enabling parameter, and the enabling parameter may be expressed as UE data transfer enabled in P-RLF and is used for instructing the UE to perform data transmission through or not through a second radio link when a failure occurs in a first radio link.

Specifically, if a value of the UE data transfer enabled in P-RLF is TRUE, it indicates that the UE performs the data transmission through the second radio link when the failure occurs in the first radio link.

If a value of the UE data transfer enabled in P-RLF is FALSE, it indicates that the UE performs data transmission not through the second radio link when the failure occurs in the first radio link.

Further, when the value of the UE data transfer enabled in P-RLF is TRUE, the first configuration message further include maximum allowable time for the UE to perform the data transmission through the second radio link, and the maximum allowable time is expressed as Max UE data transfer time in P-RLF and may be set according to an actual need.

Here, the first radio link refers to a data transmission link established between the UE and the first base station; and the second radio link refers to a data transmission link established between the UE and the base station.

The third receiving module 52 is configured to receive a first notification.

Specifically, the third receiving module 52 receives the first notification through an eNB configuration update message or an error indication message.

The first notification includes notifying the base station to perform the data transmission with the UE through a second radio link.

In this embodiment, the first base station may be an MeNB, the base station may be an SeNB, correspondingly the first radio link is a link for data transmission between the UE and the MeNB and the second radio link is a link for data transmission between the UE and the SeNB.

Embodiment 6

Figure 14:
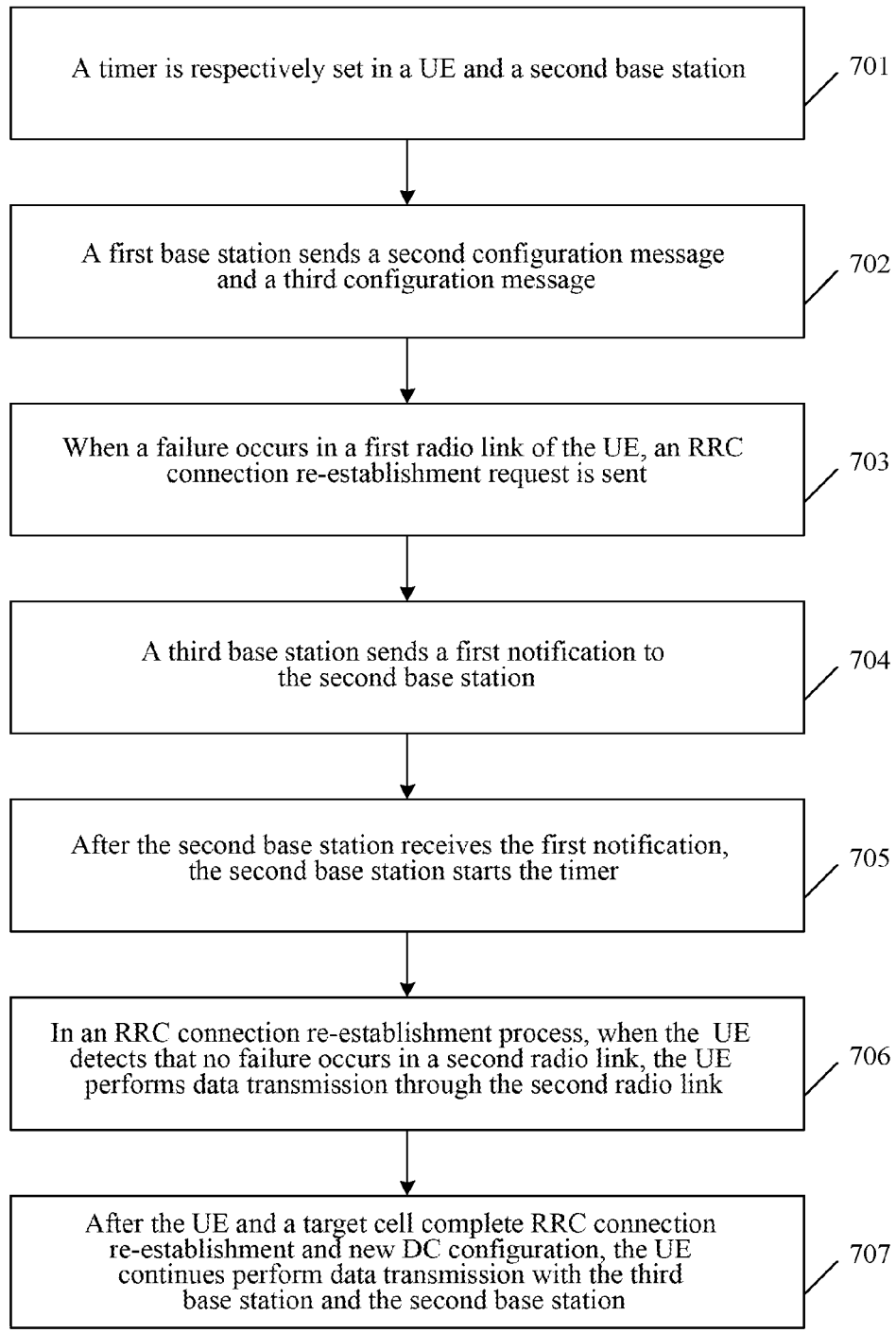
FIG. 14 illustrates a handling flowchart of a method for handling a radio link failure according to embodiment 6 of the present document.
Figure 15:
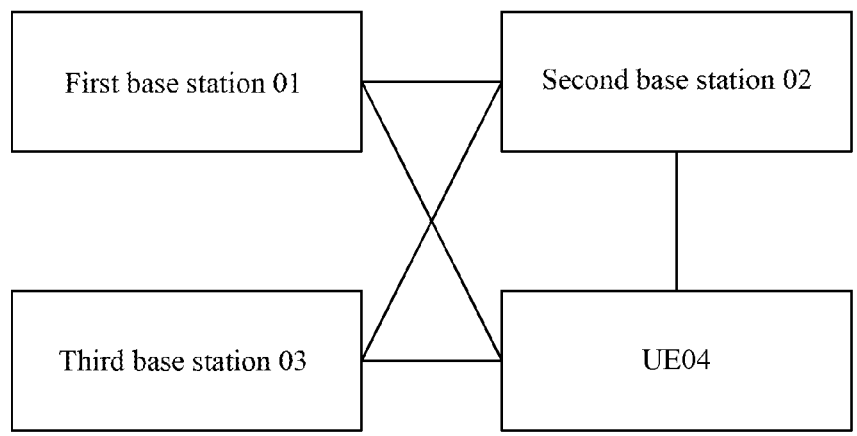
FIG. 15 illustrates a structural schematic diagram of components of a system for handling a radio link failure according to embodiment 6 of the present document.

By taking that UE is in LTE DC configuration and the UE is configured with an RRC connection for data transmission through a first base station, a main bearer for data transmission only through the first base station and an auxiliary bearer for data transmission only through a second base station as an example, in this embodiment, a specific implementation process of a method for handling a radio link failure as illustrated in FIG. 14 include the following steps.

In step 701, a timer is respectively set in a UE and a second base station.

Therein, each timer is configured to record time for the UE to perform data transmission with the second base station through a second radio link when a failure occurs in a first radio link of the UE.

In step 702, a first base station sends a second configuration message and a third configuration message.

Specifically, the first base station sends the second configuration message to the UE through an RRC connection reconfiguration message, and the first base station sends the third configuration message to the second base station through an eNB configuration update message.

Therein, the second configuration message and the third configuration message respectively include an enabling parameter, and the enabling parameter may be expressed as UE data transfer enabled in P-RLF and is used for instructing the UE to perform the data transmission through or not through a second radio link when a failure occurs in a first radio link.

Specifically, if a value of the UE data transfer enabled in P-RLF is TRUE, it indicates that the UE performs the data transmission with the second base station through the second radio link when the failure occurs in the first radio link of the UE.

If a value of the UE data transfer enabled in P-RLF is FALSE, it indicates that the UE performs the data transmission with the second base station not through the second radio link when the failure occurs in the first radio link of the UE.

Further, when the value of the UE data transfer enabled in P-RLF is TRUE, the second configuration message and the third configuration message further respectively include maximum allowable time for the UE to perform the data transmission through the second radio link, herein the maximum allowable time is expressed as Max UE data transfer time in P-RLF and may be set according to an actual need.

Step 703, an RRC connection re-establishment request is sent when a failure occurs in a first radio link of the UE.

Specifically, the UE sends the RRC connection re-establishment request to a target cell through an RRC connection re-establishment request message; and after the failure occurs in the first radio link of the UE, the UE starts the timer.

Therein, a third base station serving the target cell may be the first base station before the radio link failure occurs, and may also be a new base station that is different from the first base station.

In step 704, a third base station sends a first notification to the second base station.

Specifically, the third base station sends the first notification through an eNB configuration update message of an X2 interface or an error indication message of an X2 interface.

Therein, the first notification includes notifying the second base station to perform the data transmission with the UE through the second radio link.

In step 705, after the second base station receives the first notification, the second base station starts the timer.

In step 706, in an RRC connection re-establishment process, when the UE detects that a failure does not occur in a second radio link, the UE performs data transmission through the second radio link.

Specifically, the UE performs data transmission through the second radio link according to the second configuration message, and starts the timer.

Further, when the UE and the target cell do not complete RRC connection re-establishment and new DC configuration but the timer reaches the maximum allowable time for the UE to perform data transmission through the second radio link, the UE stops performing data transmission with the second base station through the second radio link;

or when the timer does not reach the maximum allowable time for the UE and the second base station to perform data transmission in the second configuration message but the UE and the target cell complete RRC connection re-establishment and new DC configuration, the UE stops performing data transmission with the second base station through the second radio link.

In step 707, after the UE and a target cell complete RRC connection re-establishment and new DC configuration, the UE, the third base station and the second base station continue performing the data transmission.

In this embodiment, the first base station and the third base station may be MeNBs, and the second base station may be an SeNB.

Correspondingly, the first radio link is a link for data transmission between the UE and the MeNB and the second radio link is a link for data transmission between the UE and the SeNB.

In order to implement the method for handling the radio link failure, this embodiment further provides a system for handling a radio link failure. The system includes: a first base station 01, a second base station 02, a third base station 03 and a UE 04, herein, the first base station 01 includes: a first sending module 31 and a second sending module 32, herein, the first sending module 31 is configured to send a second configuration message; and the second sending module 32 is configured to send a third configuration message.

Specifically, the first base station sends the second configuration message to the UE through an RRC connection reconfiguration message, and the first station sends the third configuration message to the second base station through an eNB configuration update message.

Therein, the second configuration message and the third configuration message respectively include an enabling parameter, and the enabling parameter may be expressed as UE data transfer enabled in P-RLF and is used for instructing the UE to perform the data transmission through or not through a second radio link when the failure occurs in the first radio link.

Specifically, if a value of the UE data transfer enabled in P-RLF is TRUE, it indicates that the UE performs the data transmission with the second base station through the second radio link when the failure occurs in the first radio link of the UE.

If a value of the UE data transfer enabled in P-RLF is FALSE, it indicates that the UE performs the data transmission with the second base station not through the second radio link when the failure occurs in the first radio link of the UE.

Further, when the value of the UE data transfer enabled in P-RLF is TRUE, the second configuration message and the third configuration message further respectively include maximum allowable time for the UE to perform the data transmission through the second radio link, and the maximum allowable time is expressed as Max UE data transfer time in P-RLF and may be set according to an actual need.

Here, the first radio link refers to a data transmission link established between the UE and the first base station; and the second radio link refers to a data transmission link established between the UE and the base station.

The second base station 02 includes: a second receiving module 51 and a third receiving module 52, herein, the second receiving module 51 is configured to receive the third configuration message.

Specifically, the second receiving module 51 receives the third configuration message through an eNB configuration update message.

The third receiving module 52 is configured to receive a first notification.

Specifically, the third receiving module 52 receives the first notification through an eNB configuration update message or an error indication message.

The first notification includes notifying the second base station 02 to perform data transmission with the UE through the second radio link.

The third base station 03 includes: a configuration module 41 and a third sending module 42, herein, the configuration module 41 is configured to perform dual-connectivity configuration.

Specifically, the configuration module 41 performs the dual-connectivity configuration on the UE 04 through an RRC connection re-establishment message.

The third sending module 42 is configured to send the first notification.

Specifically, the third sending module 42 sends the first notification to the second base station 02 through the eNB configuration update message, or sends the first notification to the second base station 02 through the error indication message.

The UE 04 includes: a first receiving module 11, a first re-establishment module 12, a first detection module 13, a first transmission module 14 and a timing module 15, herein, the first receiving module 11 is configured to receive the second configuration message;

the first re-establishment module 12 is configured to, when the failure occurs in the first radio link of the UE 04, send an RRC connection re-establishment request to perform RRC connection re-establishment;

the first detection module 13 is configured to, in an RRC connection re-establishment process, detect whether the failure occurs in the second radio link of the UE 04;

the first transmission module 14 is configured to, when the first detection module 13 detects that the failure does not occur in the second radio link of the UE 04, perform data transmission through the second radio link according to the second configuration message; and the timing module 15 is configured to record time for the UE 04 to perform the data transmission through the second radio link.

The first transmission module 14 performs the data transmission through the second transmission link, including that:

the first transmission module 14 performs data transmission through the second radio link according to the second configuration message and starts the timing module 15.

Further, when the UE and the target cell do not complete RRC connection re-establishment and new DC configuration but the timing module reaches the maximum allowable time for the UE and the second base station to perform data transmission in the second configuration message, the UE stops performing the data transmission through the second radio link;

or, when the timing module does not reach the maximum allowable time for the UE to perform the data transmission through the second link in the second configuration message but the UE and the target cell complete RRC connection re-establishment and new DC configuration, the UE stops performing the data transmission through the second radio link.

Therein, the first re-establishment module 12 sends the RRC connection re-establishment request message, including that: the UE sends an RRC connection re-establishment request to the target cell through the RRC connection re-establishment request message.

Here, a base station serving the target cell may be the first base station and may also be a new base station that is different from the first base station.

In this embodiment, the first base station may be an MeNB and the second base station may be an SeNB.

Correspondingly, the first radio link is a link for data transmission between the UE and the MeNB and the second radio link is a link for data transmission between the UE and the SeNB.

The first receiving module 11, the first re-establishment module 12, the first detection module 13, the first transmission module 14, the timing module 15, the second re-establishment module 21, the second detection module 22 and the third transmission module 23 provided in the embodiments of the present document may be implemented through a processor on the UE, and of course, may also be implemented through a specific logic circuit, and the processor may be a Central Processing Unit (CPU), a Micro Processing Unit (MPU), a Digital Signal Processor (DSP), a Field Programmable Gate Array (FPGA) or the like.

The first sending module 31, the second sending module 32, the configuration module 41, the third sending module 42, the second receiving module 51 and the third receiving module 53 provided in the embodiments of the present document may be implemented through a processor on a base station, and of course, may also be implemented through a specific logic circuit, and the processor may be a CPU, an MPU, a DSP, an FPGA or the like.

In the embodiments of the present document, if the method for handling the radio link failure is implemented in a form of software function modules and is sold or used as an independent product, the method may also be stored in a computer readable storage medium. Based on such understanding, the technical scheme of the embodiments of the present document substantially or the portions which make contributions may be reflected in the form of software product, the computer software product is stored in a storage medium and includes a plurality of instructions which enable a computer device (which may be a personal computer, a server or a network device) to execute all or partial steps of the method provided by each embodiment of the present document. The foresaid storage medium includes various mediums capable of storing program codes, such as a USB flash disk, a mobile hard disk, a Read-Only Memory (ROM), a magnetic disk or a compact disk. Therefore, the embodiments of the present document are not limited to any specific combination of the hardware and software.

Correspondingly, the embodiment of the present document further provides a computer storage medium, the computer storage medium storing a computer program, herein, the computer program is used to execute the above method for handling the radio link failure in the embodiments of the present document.

The embodiments described above are just embodiments of the present document and are not used for limiting the protection scope of the present document.

What is claimed is:

1. A method for handling a radio link failure, comprising:
    a User Equipment, UE, in dual-connectivity configuration receiving a first configuration message containing an enabling parameter, which is used for instructing the UE whether to perform data transmission through a second radio link when failure occurs in a first radio link but no failure occurs in the second radio link, from a first base station;
    when the first radio link between the UE and the first base station fails, sending a Radio Resource Control, RRC, connection re-establishment request message, and performing a RRC connection re-establishment;
    in case that the enabling parameter indicates the UE not to perform data transmission through a second radio link when failure occurs in the first radio link but no failure occurs in the second radio link, the UE does not transmit data, which fails to be transmitted through failed the first radio link, through the second radio link;
    in case that the enabling parameter indicates the UE to perform data transmission through a second radio link when failure occurs in the first radio link but no failure occurs in the second radio link, in a RRC connection re-establishment process, when the UE detects that no failure occurs in the second radio link between the UE and the second base station, performing data transmission through the second radio link;
    wherein performing data transmission through the second radio link comprises transmitting data, which fails to be transmitted through failed the first radio link, through the second radio link.

2. The method for handling the radio link failure according to claim 1, wherein the method further comprises: setting a timer in the UE, and after the failure occurs in the first radio link of the UE, starting the timer.

3. The method for handling the radio link failure according to claim 1, wherein, the first configuration message further comprises maximum allowable time for the UE to perform the data transmission through the second radio link.

4. A User Equipment, UE, in dual-connectivity configuration, comprising a processor and a memory, wherein the processor is configured to execute instructions contained in the memory to:
    receive a first configuration message from a first base station;
    wherein the first configuration message contains an enabling parameter, which is used for instructing the UE whether to perform data transmission through a second radio link when failure occurs in a first radio link but no failure occurs in the second radio link;
    when a failure occurs in a first radio link between the UE and the first base station, send a Radio Resource Control, RRC, connection re-establishment request message, and perform a RRC connection re-establishment;
    in case that the enabling parameter indicates the UE not to perform data transmission through a second radio link when failure occurs in the first radio link but no failure occurs in the second radio link, not transmit data, which fans to be transmitted through failed the first radio link, through the second radio link;
    in case that the enabling parameter indicates the UE to perform data transmission through a second radio link when failure occurs in the first radio link but no failure occurs in the second radio link, in a RRC connection re-establishment process, detect whether a failure occurs in a second radio link between the UE and a second base station; and
    when no failure occurs in the second radio link of the UE, perform data transmission through the second radio link according to the enabling parameter in the first configuration message;
    wherein performing data transmission through the second radio link comprises transmitting data, which fans to be transmitted through failed the first radio link, through the second radio link.

5. The UE according to claim 4, wherein the-processor is further configured to:
    after the failure occurs in the first radio link, record time for the UE to perform the data transmission through the second radio link.

6. The UE according to claim 4, wherein the first configuration message further comprises maximum allowable time for the UE to perform the data transmission through the second radio link.

7. A non-transitory computer storage medium, storing computer-executable instructions, wherein, the computer-executable instructions are used to execute the method for handling the radio link failure according to claim 1.

* * * * *